(12) United States Patent
Nunez Mencias et al.

(10) Patent No.: US 12,164,911 B2
(45) Date of Patent: Dec. 10, 2024

(54) MONITORING AND AUDITING SECURE SOFTWARE BUILDS

(71) Applicant: International Business Machines Corporation, Armonk, NY (US)

(72) Inventors: Angel Nunez Mencias, Stuttgart (DE); Thomas Pohl, Weil im Schoenbuch (DE); Timo Kussmaul, Boeblingen (DE); Ralf Schaufler, Weil im Schoenbuch (DE); Simon Spinner, Stuttgart (DE); Kai Brennenstuhl, Boeblingen (DE); Martin Tröster, Renningen (DE)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 17/720,618

(22) Filed: Apr. 14, 2022

(65) Prior Publication Data
US 2023/0334147 A1 Oct. 19, 2023

(51) Int. Cl.
*G06F 9/455* (2018.01)
*G06F 8/61* (2018.01)
(Continued)

(52) U.S. Cl.
CPC ............ *G06F 8/71* (2013.01); *G06F 9/466* (2013.01); *G06F 11/3466* (2013.01);
(Continued)

(58) Field of Classification Search
CPC ... G06F 8/71; G06F 8/77; G06F 9/466; G06F 11/3466; G06F 11/3604; G06F 11/3636;
(Continued)

(56) References Cited

U.S. PATENT DOCUMENTS 6,282,701 B1 * 8/2001 Wygodny ........... G06F 11/3664
709/224
8,954,752 B2 2/2015 Boivie
(Continued)

FOREIGN PATENT DOCUMENTS

CN 101154258 A 4/2008
CN 110851135 A 2/2020

OTHER PUBLICATIONS

Abdelwahab Hamou-Lhadj et al., Measuring Various Properties of Execution Traces to Help Build Better Trace Analysis Tools, 2005 IEEE, [Retrieved on Jun. 5, 2024]. Retrieved from the internet: <URL: https://ieeexplore.ieee.org/stamp/stamp.jsp?arnumber=1467938> 10 Pages (1-10) (Year: 2005).*
(Continued)

*Primary Examiner* — Anibal Rivera
(74) *Attorney, Agent, or Firm* — Aaron N. Pontikos (57) ABSTRACT

A computer-implemented method for monitoring and auditing secure software builds is disclosed. The computer-implemented includes receiving a build file containing a sequence of build instructions. The computer-implemented method further includes, for each build instruction being executed: determining an indicator value corresponding to a monitoring level associated with a build instruction; and modifying logging of trace information associated with a computing system executing the build instruction based, at least in part, on the indicator value corresponding to the monitoring level.

20 Claims, 9 Drawing Sheets

(51) Int. Cl.

| | |
|---|---|
| *G06F 8/71* | (2018.01) |
| *G06F 8/73* | (2018.01) |
| *G06F 9/44* | (2018.01) |
| *G06F 9/46* | (2006.01) |
| *G06F 11/34* | (2006.01) |
| *G06F 11/36* | (2006.01) |
| *G06F 21/44* | (2013.01) |
| *G06F 21/54* | (2013.01) |
| *G06F 21/55* | (2013.01) |
| *G06F 21/57* | (2013.01) |
| *G06F 21/64* | (2013.01) |
| *G06F 8/77* | (2018.01) |

(52) U.S. Cl.
CPC ...... *G06F 11/3604* (2013.01); *G06F 11/3636* (2013.01); *G06F 21/54* (2013.01); *G06F 21/554* (2013.01); *G06F 21/577* (2013.01); *G06F 21/64* (2013.01); *G06F 8/77* (2013.01); *G06F 11/3616* (2013.01); *G06F 11/3676* (2013.01)

(58) Field of Classification Search
CPC .. G06F 11/3616; G06F 11/3676; G06F 21/54; G06F 21/554; G06F 21/577; G06F 21/64
See application file for complete search history.

(56) References Cited

U.S. PATENT DOCUMENTS

| | | | |
|---|---|---|---|
| 9,183,578 B1 | 11/2015 | Reeser et al. | |
| 9,535,687 B2 | 1/2017 | Clemm | |
| 10,671,510 B1 * | 6/2020 | Willson | G06F 11/3676 |
| 11,474,796 B1 * | 10/2022 | Mather | G06F 8/77 |
| 2008/0033846 A1 | 2/2008 | Rehrauer | |
| 2012/0151209 A1 | 6/2012 | Visnyak | |
| 2016/0269441 A1 | 9/2016 | Savage | |
| 2018/0129497 A1 * | 5/2018 | Biddle | G06F 11/3668 |
| 2019/0213319 A1 | 7/2019 | Gerebe | |
| 2019/0235861 A1 | 8/2019 | Suarez | |
| 2020/0304526 A1 | 9/2020 | Abraham | |
| 2021/0303431 A1 * | 9/2021 | Grigoryan | G06F 11/3476 |
| 2023/0244817 A1 * | 8/2023 | Knierim | G06F 21/51 726/26 |

OTHER PUBLICATIONS

"Secure Build and Policy Updates", An IP.com Prior Art Database Technical Disclosure, Authors et al.: Disclosed Anonymously, IP.com No. IPCOM000263761D, IP.com Electronic Publication Date: Oct. 2, 2020, 5 pages.

Mell et al., "The NIST Definition of Cloud Computing", Recommendations of the National Institute of Standards and Technology, NIST Special Publication 800-145, Sep. 2011, 7 pages.

The State Intellectual Property Office of People's Republic of China, "First Office action", mailed on Aug. 7, 2024, 10 Pages, CN Application No. 202111438948.1.

Unknown, "Method Study on the Reliability and Security of Data Exchange in G/S Mode Based on Middleware" Thesis, China Academic Journal Electronic Published House, 2014, 136 Pages.

Wang et al. "An M-Cache-Based Security Monitoring and Fault Recovery Architecture for Embedded Processor", IEEE Transactions on Very Large-Scale Integration (VLSI) Systems, Nov. 2020, pp. 2314-2327, vol. 28, Issue No. 11, DOI:10.1109/TVLSI.2020.3021533.

* cited by examiner

MONITORING AND AUDITING SECURE SOFTWARE BUILDS

BACKGROUND

The present invention relates generally to software builds, and more specifically, to monitoring and auditing secure software builds.

In order to provide confidential computing and trusted platforms, IT (information technology) vendors have made significant efforts in order to protect software programs created during the software build process. An objective of the secure software build process is to ensure that (i) code is built within a trusted execution environment so that no modifications may be done by any administrators by whom the code is being built, (ii) keys used to sign the resulting binary (typically an OCI [Open Container Initiative] image) are protected by the trusted execution environment, and (iii) manifests are created at the same time the binary is built. Typically, the manifest includes the sources used by the build and a hash of the built binary. The manifest is signed by a key protected by the trusted execution environment. The manifest may then be used by the authors to check that no malicious code has been added to the binaries.

SUMMARY

According to one embodiment of the present invention, a computer-implemented method for monitoring and auditing secure software builds is disclosed. The computer-implemented includes receiving a build file containing a sequence of build instructions. The computer-implemented method further includes, for each build instruction being executed: determining an indicator value corresponding to a monitoring level associated with a build instruction; and modifying logging of trace information associated with a computing system executing the build instruction based, at least in part, on the indicator value corresponding to the monitoring level.

According to another embodiment of the present invention, a computer program product for monitoring and auditing secure software builds is disclosed. The computer program product includes one or more computer readable storage media and program instructions stored on the one or more computer readable storage media. The program instructions include instructions to determine an indicator value corresponding to a monitoring level associated with a build instruction. The program instructions further include, for each build instruction being executed, instructions to: determine an indicator value corresponding to a monitoring level associated with a build instruction; and modify logging of trace information associated with a computing system executing the build instruction based, at least in part, on the indicator value corresponding to the monitoring level.

According to another embodiment of the present invention, a computer system for monitoring and auditing secure software builds is disclosed. The computer system includes one or more computer system includes one or more computer processors, one or more computer readable storage media, and program instructions stored on the computer readable storage media for execution by at least one of the one or more processors. The program instructions include instructions to determine an indicator value corresponding to a monitoring level associated with a build instruction. The program instructions further include, for each build instruction being executed, instructions to: determine an indicator value corresponding to a monitoring level associated with a build instruction; and modifying logging of trace information associated with a computing system executing the building instruction based, at least in part, on the indicator value corresponding to the monitoring level.

BRIEF DESCRIPTION OF THE DRAWINGS

It should be noted that embodiments of the present invention are described with reference to different statutory classes. In particular, some embodiments are described with reference to computer-implemented methods, whereas other embodiments are described with reference to computer program products and computer systems. However, a person skilled in the art will gather from the above and the following description that, unless otherwise notified, in addition to any combination of features belonging to one type of statutory class, also any combination between features relating to different statutory classes, in particular, between features of the computer-implemented methods, and features of the computer program products and computer systems, is considered as to be disclosed within this document.

The aspects defined above, and further aspects of the present invention, are apparent from the examples of embodiments to be described hereinafter and are explained with reference to the examples of embodiments, but to which the invention is not limited. Embodiments of the present invention will be described, by way of example only, and with reference to the following drawings.

DETAILED DESCRIPTION

The present invention relates generally to software builds, and more specifically, to monitoring and auditing secure software builds.

Embodiments of the present invention recognize that although manifests created while building the binary are useful for security purposes, they are difficult to monitor and audit due to the various sources (e.g., different base operating systems, different middleware runtime environments and libraries, different software build application programs, and historical changes made to files associated with a software build) used to build an open container initiative (OCI) image. Accordingly, embodiments of the present invention recognize a need for process for monitoring and auditing software builds that reduces the amount of time and resources utilized when analyzing the data included in a manifest, while still maintaining a high detection rate of potential malicious code introduced during a software build.

Embodiments of the present invention provide for the building of software in a highly trusted execution environment with little to no risk of being compromised by malicious code during the build process. According to an embodiment of the present invention, a build file containing a sequence of build instructions is received. While each build instruction in the sequence of build instructions is executed, an indicator value corresponding to a monitoring level is set, and a level of required logging is selected based, at least in part, on the respective indicator level.

Based on at least the foregoing embodiment of the present invention, one or more of features, characteristics, operations, advantages, and/or improvements to the aforementioned challenges in the field of software build security is achieved by increasing a level of security for building software application from a number of different sources.

In an embodiment, lengthy trace log files created during the build process are eliminated, thereby reducing the overall size of manifest files and thus the amount of time and computing resources required for analyzing manifest files. This is accomplished by providing an administrator responsible for the build process with a fine-grained control of the particular trace information captured in the log file. The level of detail of the trace of a system executing a build instruction may include, but is not limited to, one or more of: network usage, incoming communication messages, outgoing communication messages, system build process data, called routines, command level interface inputs, and respective metrics thereof.

In an embodiment, based on an associated indicator value corresponding to a monitoring level of the software build, a particular level of logging is performed. For example, the particular data and the specificity of data included in trace log files may be configurable to only store those build instructions and related data that are identified as suspicious or potentially suspicious. In an embodiment, the monitoring level and thus the indicator value may be set differently for each type of build instruction for a given software build. For example, the particular data and the specificity of data included in a first trace log file for build instruction A may be different than the particular data and the specificity of data included in a second trace log file for build instruction B.

In an embodiment, the indicator value corresponding to a monitoring level of the software build may be set based on particular configurable identified critical instructions (e.g., restricted and/or unallowed instructions). For example, configuration of the particular critical instructions may be set by an administrator prior to the start of a build process. In another example, configuration of the particular critical instructions may be automatically set (without human intervention) based on a specific computing environment and/or prior historical build data associated with a particular build process.

In an embodiment, the indicator value corresponding to a monitoring level of the software build may be set based on a hardcoded mapping table. The hardcoded table may include a first list of unallowed critical, potential malicious, or known malicious build instructions and a second list of allowed, safe build instructions. The hardcoded mapping table may be edited using standard editing tools and/or may have user interface, such as a web interface. For example, the hardcoded mapping table may be editable and controllable by a security administrator. In another example, the hardcoded mapping table may be editable and controllable by a computer program or computer module (without human intervention) in accordance with at least one embodiment of the present invention.

In an embodiment, the execution of a sequence of build instructions is terminated based on comparing log file entries to entries included a permitted list of entries and/or entries included in an unpermitted list of entries and matching a build code included a log file entry to a same build code included in an unpermitted list of build instructions. Such lists may provide for a second level of verification as to whether particular identified build instructions include malicious code. In an embodiment, if build instructions include code included in an unpermitted list of entries, the code is automatically blocked or otherwise prevented from being incorporated in the software build.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" and "dynamically" mean without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user" and "individual" each refer to a human being.

As defined herein, "build", "builds," "software build" or "software build process" means a process of converting source code files into stand-alone software artifacts that can be run on a computing device, or the result of doing so. This may involve — in an end-to-end process — one or more activities including, but not limited to, version control, managing code quality, and compiling the source code into machine-readable code.

As defined herein, "build file" means the resulting file of a software build process.

As defined herein, "build instruction" means a command (e.g., in a line-by-line procedure) describing which step(s) to be taken and/or which source may be used for the software build process.

As defined herein, "indicator value" means an alphanumeric term, abbreviation, or any human-readable expression indicative of a monitoring level executed during the software build process.

As defined herein, "monitoring level" means the depth of trace activities and/or a number of tests and particular type of tests executed during the software build process.

As defined herein, "level of required logging" means a predefined value corresponding to an indicator value that describes the particular events, and when these particular events and results thereof are to be stored in a log file.

As defined herein, "detailed trace" means a result of a trace process of the software build.

As defined herein, "audit trail" means a sequence of log events and results captured during the software build process.

As defined herein, "unauthorized transaction" means an instruction relating to a predefined potential and/or known malicious activity (e.g., unknown software code, unknown network connections, and unknown links) during the software build process. For example, an unauthorized transaction is an unpermitted build code instruction or a build code instruction included in an unpermitted list.

As defined herein, "configurable identified critical instruction" means a build instruction received for executing the software build process.

As used herein, "hardcoded mapping table" means a table defining at least one of permitted build code instructions and unpermitted build code instructions.

As used herein, "permitted list" means those build code instructions in the build file that are permitted to be used in the software build process.

As defined herein, "unpermitted list" means those build code instructions in the build file that are not permitted to be used in the software build process.

As define herein, "manifest file" or "manifest" means a file comprising metadata for a group of accompanying files that are part of a set or coherent unit. As an example, the files of a computer program may have a manifest describing the name, the version number, the license and the constituting files—and potentially other metadata—of an executable software program.

As defined herein, "Docker" means a set of platform-as-a-service (Paas) products that use operating system-level virtualization to deliver software packaged called containers.

The terms first, second, etc. may be used herein to describe various elements. These elements should not be limited by these terms, as these terms are only used to distinguish one element from another unless stated otherwise or the context clearly indicates otherwise.

Figure 1:
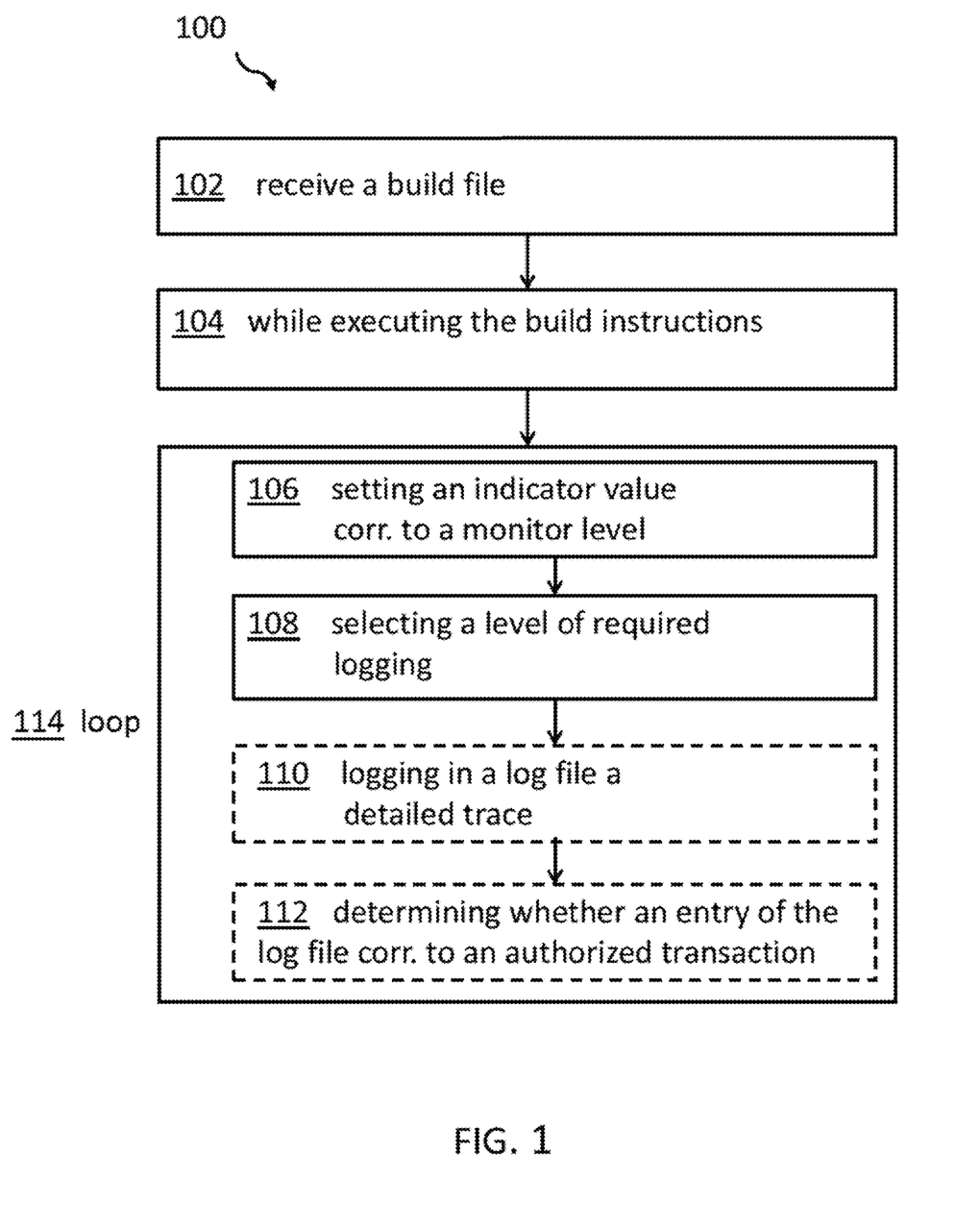
FIG. 1 is a flowchart diagram, generally designated 100, depicting operational steps for monitoring and auditing secure software builds in accordance with at least one embodiment of the present invention.

Referring now to various embodiments of the invention in more detail, FIG. 1 is a flowchart diagram, generally designated 100, depicting operational steps for monitoring and auditing secure software builds in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

At step 102, a build file is received. For example, the build file is received from a Git repository or any generally known code repositories. In an embodiment, the build file includes a sequence of build instructions for a software build. At step 104, the build instructions included in the build file are executed. At step 106, while executing each build instruction included in the build file, an indicator level associated with the build instruction is determined. In an embodiment, the indicator level associated with a build instruction is determined prior to beginning the execution of the build instruction. In an alternative embodiment, the indicator level associated with a build instruction is determined during execution of the build instruction. At step 108, while executing each build instruction included in the build file, a level of logging performed during execution of the build instruction is modified based, at least in part, on the indicator level corresponding to the build instruction.

At optional step 110, while executing each build instruction included in the build file, a detailed trace of a system executing the build instruction is logged in a log file. At optional step 112, the log file entries are analyzed to determine whether a log file entry corresponds to an authorized transaction. The process of steps 106 and 108 (and optional steps 110 and 112) can be performed in a loop 114 during execution of each build instruction included in the build file.

Figure 2:
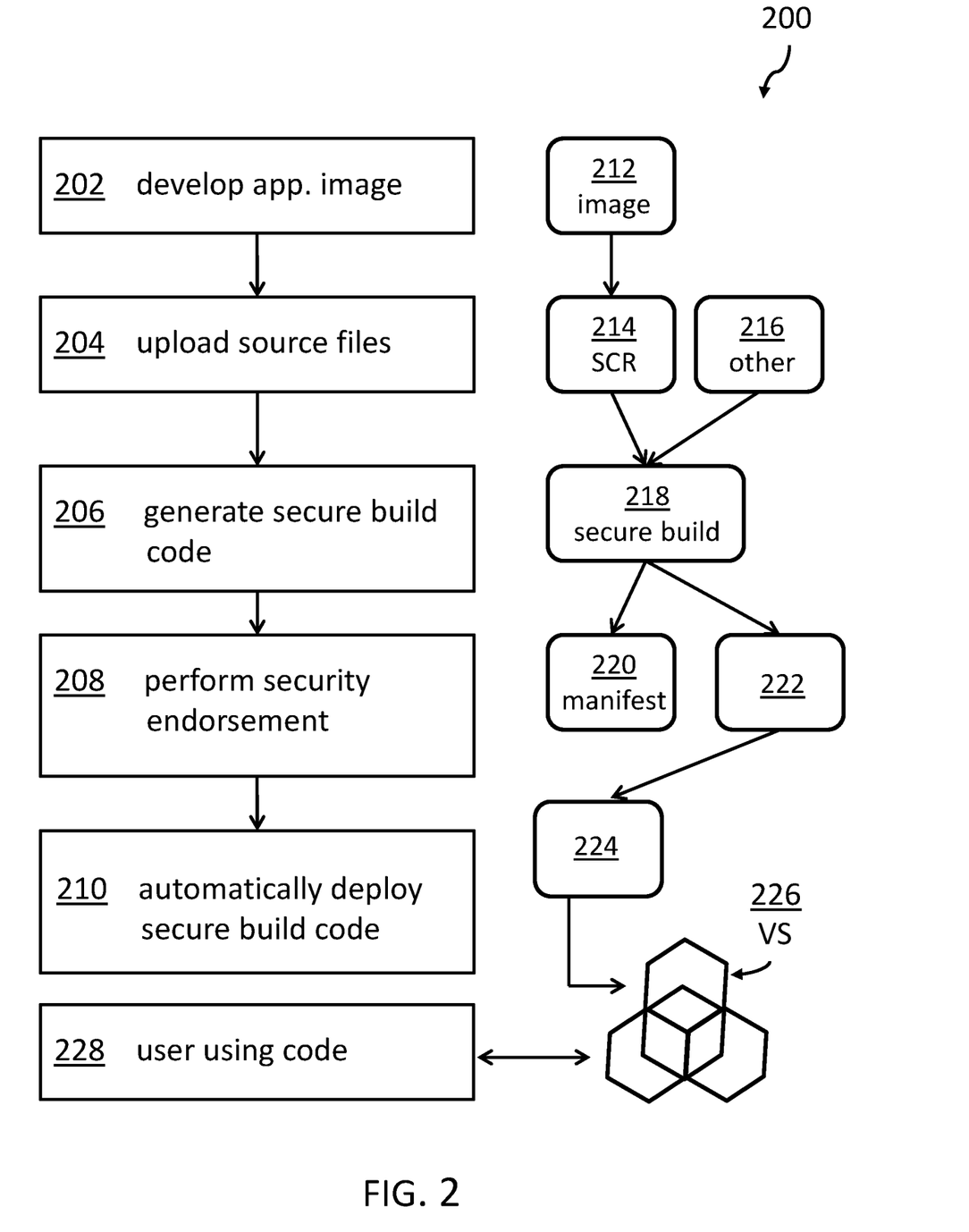
FIG. 2 is a flowchart diagram, generally designated 200, depicting operational steps for a secure build process in accordance with at least one embodiment of the present invention.

FIG. 2 is a flowchart diagram, generally designated 200, depicting operational steps for a secure build process in accordance with at least one embodiment of the present invention. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

A software build pipeline begins at step 202 with a selection of a developed application image. At step 204, the source code corresponding to the developed application image is uploaded to a source code repository. In an embodiment, other sources in addition to the developed application image may be uploaded to the source code repository at this time. At step 206, the secure build code is generated, and at step 208, a security endorsement is performed. At step 210, the generated secure build code is automatically deployed from a containerization platform (e.g., Docker) so that a user can use the secure code at step 228.

It should be noted that the right side of FIG. 2 shows the involved data related elements associated with the developed application image. This includes the image 212, the source code repository (SCR) 214, other sources 216, the secure build 218, the manifest 220, a container image 222 (e.g., a Docker image), and a container image repository 224 (e.g., a Docker image repository) from which a user may use, at step 228, the secure code in a virtual server (VS) 226 (e.g., a hyper secure virtual server (HPVS)).

Figure 3:
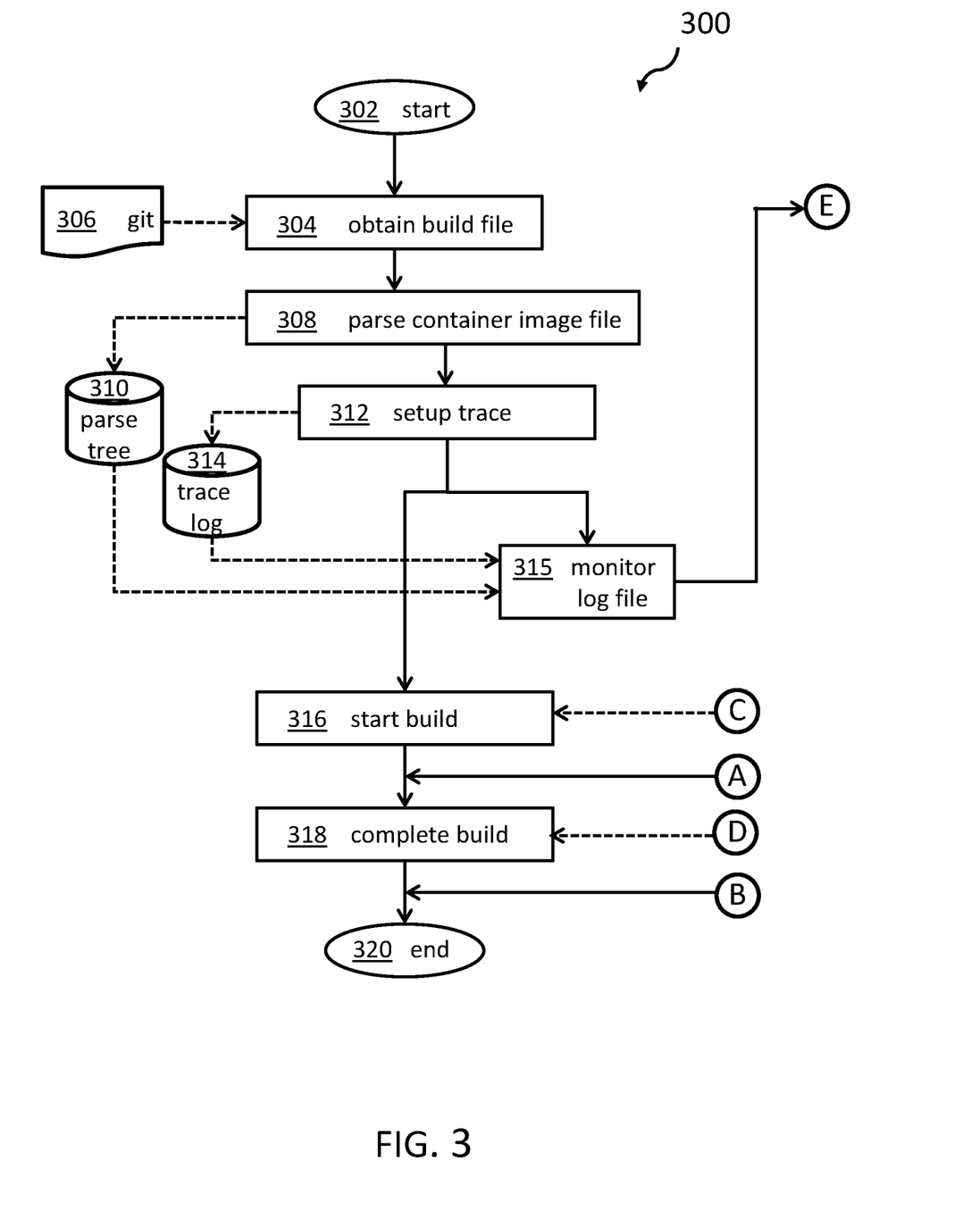
FIGS. 3 and 4 are a first portion and a second portion of a flowchart diagram, generally designated as 300 and 400, respectively, depicting operational steps for monitoring and auditing securing software builds in accordance with at least one embodiment of the present invention.
Figure 4:
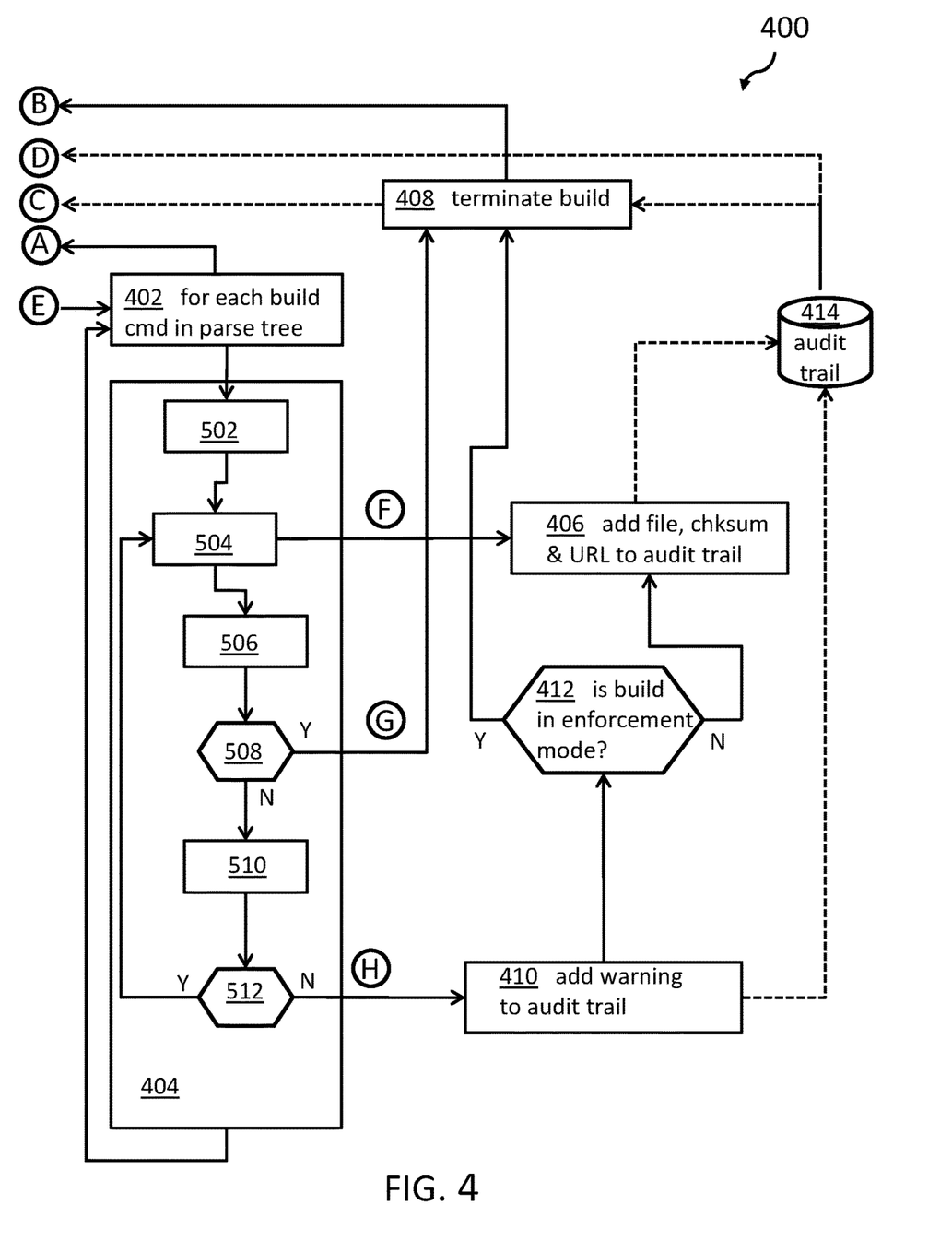

FIGS. 3 and 4 are a first portion and a second portion of a flowchart diagram, generally designated as 300 and 400, respectively, depicting operational steps for securely building code in accordance with at least one embodiment of the present invention. FIGS. 3 and 4 provide an illustration of only one implementation and does not imply any limitations with regard to the environments in which different embodiments may be implemented. Many modifications to the depicted environment may be made by those skilled in the art without departing from the scope of the invention as recited by the claims. It should be noted that solid lines in FIGS. 3 and 4 relate to process flows, whereas dotted lines relate to data dependencies or data flows.

Beginning at step 302 of FIG. 3., the software build process beings. At step 304, a build file is obtained (e.g., from git repository 306 or another code repository). At step 308, the build file is parsed in order to generate a parse tree at step 310. At step 312, a trace process is configured and a trace log is generated at step 314 based on the particular configuration of the trace process. For each build instruction in the build file, the log file or trace is monitored at step 315 while the build process is underway at step 316. If all build instructions included in the build file have been executed properly, the build process is completed at step 318 and the process terminates at step 320.

Figure 5:
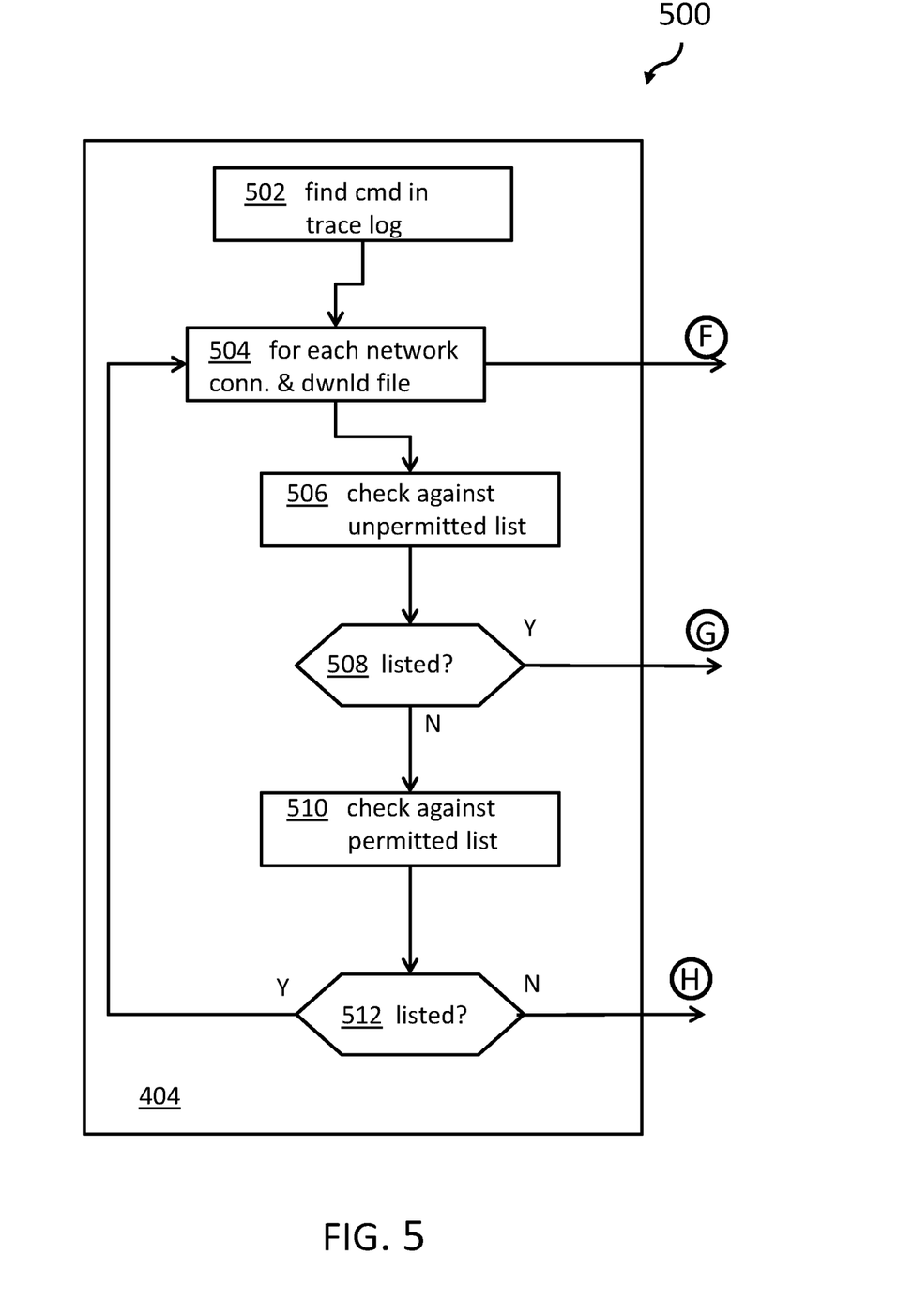
FIG. 5 is a flowchart diagram, generally designated 500, depicting operational subroutine steps for each executed build instruction of FIGS. 3 and 4 in accordance with at least one embodiment of the present invention.

Moving from hand-over point "E" of FIG. 3 to step 402 of FIG. 4, for each build instruction included in the parse tree, a subroutine 404, which includes steps 502-512, is executed in accordance with the steps of FIG. 5. Turning now to FIG. 5, FIG. 5 includes steps 502-512, generally designated 500, of subroutine 404 in accordance with at least one embodiment of the present invention. At step 502, a command in the trace log is identified. At step 504, for each network connection and downloaded file, a loop 504 is executed. At step 506 of loop 504, the build instruction is compared with an unpermitted list of potential malicious build instructions or those having the potential to access malicious code portions or network connections. Furthermore, in parallel with step 506, and as indicated via hand-over point "F", the image file is accessed together with a checksum and a universal resource locator (URL) to the audit trail 414.

Returning now to FIG. 4, at decision step 508 of subroutine 404, a determination based on the comparison is made as to whether the build instruction is included in the unpermitted list. If the build instruction is included in the unpermitted list (decision step 508 "Y" branch), the build process is terminated at step 408 and the process returns to step 316 of FIG. 3 as indicated via hand-over point "C". If the build instruction is not included in the unpermitted list (decision step 508 "N" branch), the build process continues to step 510 of subroutine 404, at which the build instruction is compared with a permitted list of build instructions.

At decision step 512 of subroutine 404, a determination is made as to whether the build instruction is included in the permitted list. If the build instruction is included in the permitted list (decision step 512 "Y" branch), the process returns to step 504 of subroutine 404. If the build instruction is not included in the permitted list (decision step 512 "N" branch), a warning is generated at step 410 and the warning is added to the trace log at step 314 (depicted in FIG. 3).

At decision step 412, a determination is made as to whether the build process is being executed in an enforcement mode. In an enforcement mode, the build process is terminated when a warning that the build instruction is not included in the permitted list is generated. In a non-enforcement mode, the building process is permitted to continue when a warning that the build instruction is not included in the permitted list is generated. If the build process is being executed in an enforcement mode (decision step 412 "Y" branch), the build process is terminated at step 408 and the process returns to step 316 (depicted in FIG. 3). If the build process is not being executed in an enforcement mode (decision step 412 "N" branch), the build process is permitted to continue and the image file, checksum, and URL associated with the build instruction is added to the trace log at step 406. In an embodiment, in response to a completion of the software build process, a manifest file is signed.

Figure 6:
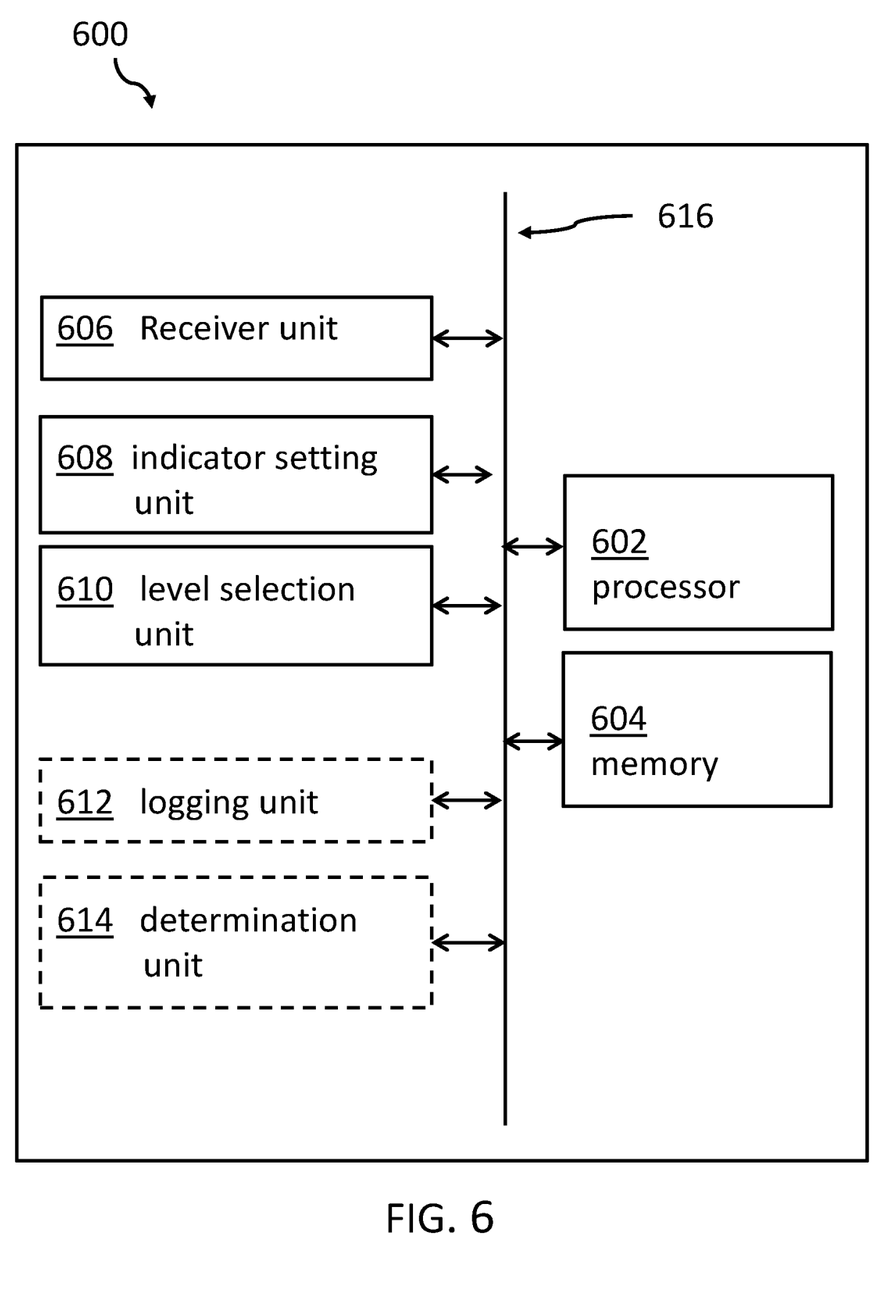
FIG. 6 is a block diagram depicting components of a software build system, generally designated 600, for monitoring and auditing secure software builds in accordance with at least one embodiment of the present invention.

FIG. 6 is a block diagram depicting components of a software build system, generally designated 600, for monitoring and auditing secure software builds in accordance with at least one embodiment of the present invention. FIG. 6 provides an illustration of only one implementation and does not imply any limitations with regard to the environments in which different embodiments may be implemented. Many modifications to the depicted environment may be made by those skilled in the art without departing from the scope of the invention as recited by the claims.

Software build system 600 includes a memory 604 coupled to a processor 602. The memory 604 stores program code portions, which enables, when executed, the processor 602 to receive, in particular using a receiver unit 606, a build file including a sequence of build instructions, and while executing the build instructions, for each build instruction, enables the processor to: set an indicator value (via an indicator setting unit 608) correspond to a monitoring level, and select a level (via a level selection unit 610) of required logging based on the indicator level. In an embodiment, an optional logging unit 612 is configured to log a detailed trace of a system executing the build instructions in a log file. In an embodiment, an optional determination unit 614 is configured to determine, based on an analysis of the log file, whether each entry of the log file corresponding to an authorized transaction of a software build.

Figure 7:
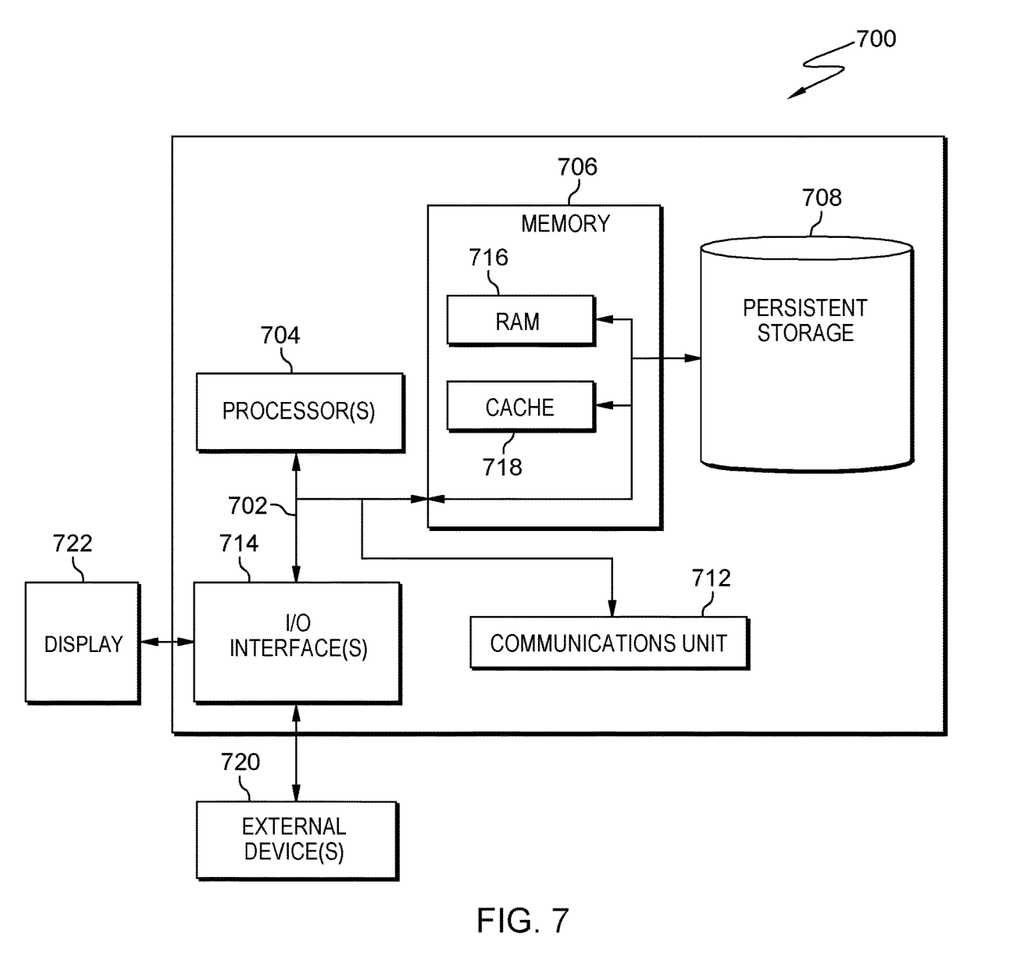
FIG. 7 is a block diagram, generally designated 700, depicting components of a computer suitable for operation of the software build system of FIG. 6.

FIG. 7 is a block diagram depicting components of a computing system, generally designated 700, suitable for executing embodiments of the present invention. In an embodiment, software build system 600 of FIG. 6 may be connected to computing system 700 via communications fabric 702. Computing device 700 includes one or more processor(s) 704 (including one or more computer processors), communications fabric 702, memory 706 including, RAM 716 and cache 718, persistent storage 708, communications unit 712, I/O interface(s) 714, display 722, and external device(s) 720. It should be appreciated that FIG. 7 provides only an illustration of one embodiment and does not imply any limitations with regard to the environments in which different embodiments may be implemented. Many modifications to the depicted environment may be made.

As depicted, computing device 700 operates over communications fabric 702, which provides communications between computer processor(s) 704, memory 706, persistent storage 708, communications unit 712, and input/output (I/O) interface(s) 714. Communications fabric 702 can be implemented with any architecture suitable for passing data or control information between processor(s) 704 (e.g., microprocessors, communications processors, and network processors), memory 706, external device(s) 720, and any other hardware components within a system. For example, communications fabric 702 can be implemented with one or more buses.

Memory 706 and persistent storage 708 are computer readable storage media. In the depicted embodiment, memory 706 includes random-access memory (RAM) 716 and cache 718. In general, memory 706 can include any suitable volatile or non-volatile one or more computer readable storage media.

Program instructions for carrying out embodiments of the present invention can be stored in persistent storage 708, or more generally, any computer readable storage media, for execution by one or more of the respective computer processor(s) 704 via one or more memories of memory 706. Persistent storage 708 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 can include one or more network interface cards. Communications unit 712 may provide communications through the use of either or both physical and wireless communications links. In the context of some embodiments of the present invention, the source of the various input data may be physically remote to computing device 700 such that the input data may be received, and the output similarly transmitted via communications unit 712.

I/O interface(s) 714 allows for input and output of data with other devices that may operate in conjunction with computing device 700. For example, I/O interface(s) 714 may provide a connection to external device(s) 720, which may be as a keyboard, keypad, a touch screen, or other suitable input devices. External device(s) 720 can also include portable computer readable storage media, for example thumb drives, portable optical or magnetic disks, and memory cards. Software and data used to practice embodiments of the present invention can be stored on such portable computer readable storage media and may be loaded onto persistent storage 708 via I/O interface(s) 714. I/O interface(s) 714 also can similarly connect to display 722. Display 722 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
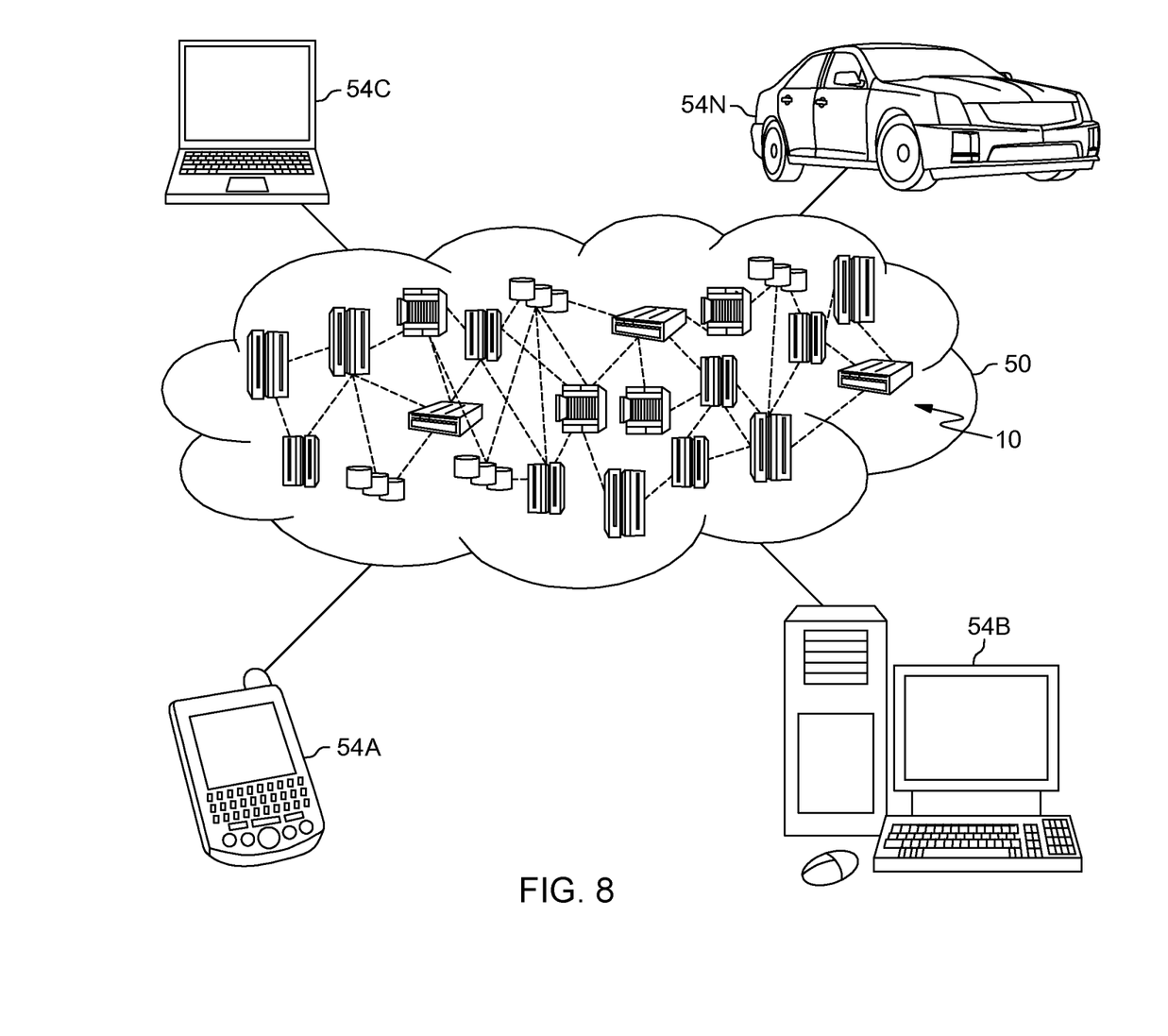
FIG. 8 is a block diagram depicting a cloud computing environment in accordance with at least one embodiment of the present invention.

FIG. 8 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
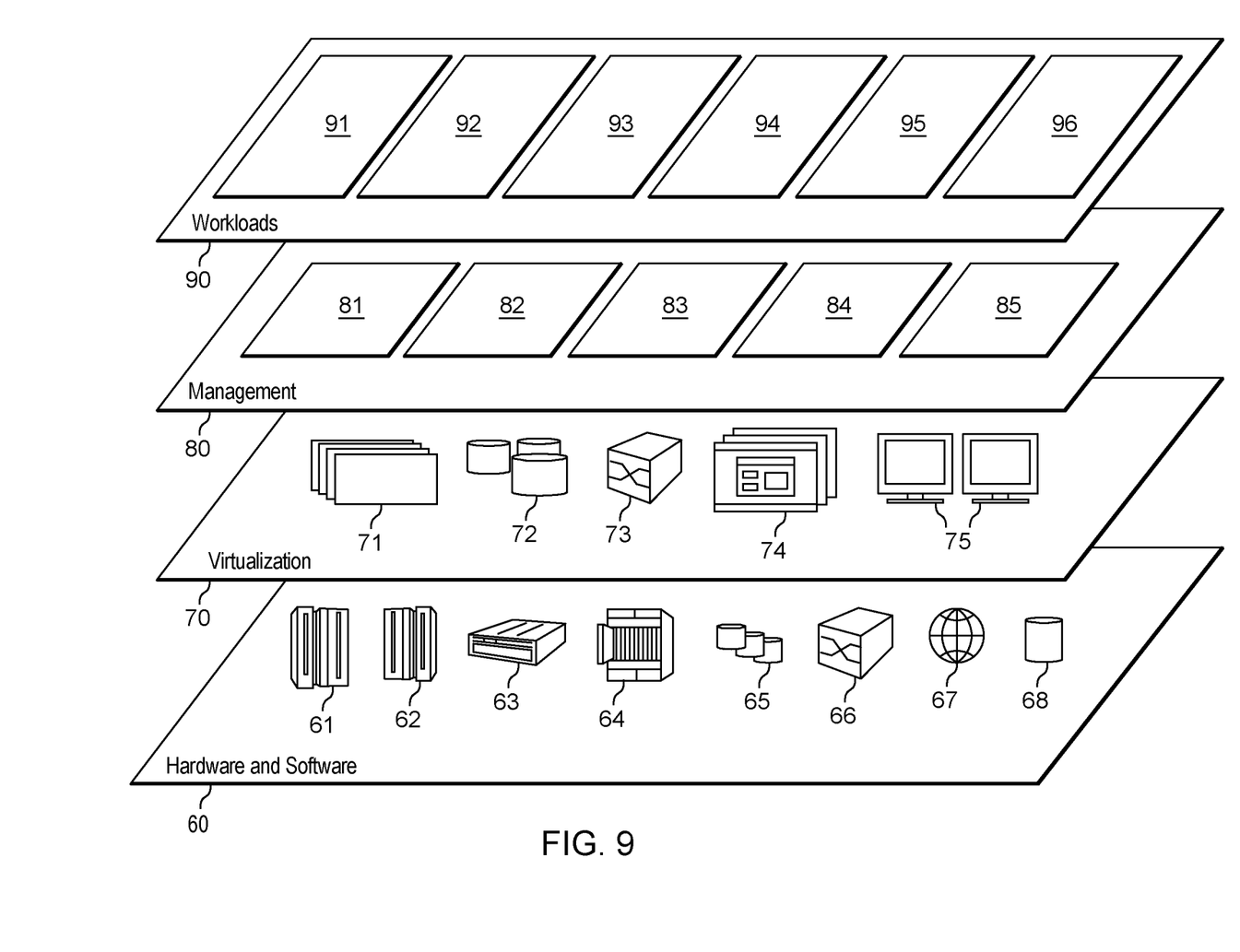
FIG. 9 is block diagram depicting a set of functional abstraction model layers provided by the cloud computing environment depicted in FIG. 8 in accordance with at least one embodiment of the present invention.

FIG. 9 is block diagram depicting a set of functional abstraction model layers provided by cloud computing environment 50 depicted in FIG. 8 in accordance with at least one embodiment of the present invention. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure software building 96.

What is claimed is:

1. A computer-implemented method for monitoring and auditing secure software builds, comprising:
  executing, by one or more processors, a sequence of build instructions included in a build file; and
  while executing, by the one or more processors, each build instruction included in the build file:
    setting, by the one or more processors, an indicator value corresponding to a monitoring level associated with a build instruction, wherein the monitoring level is a depth of trace activities executed during the execution of the build instruction; and
    modifying, by the one or more processors, a level of logging of trace information derived from the depth of the trace activities executed during the execution of the build instruction based, at least in part, on the indicator value corresponding to the monitoring level.

2. The computer-implemented method of claim 1, wherein one or more particular types of the trace information derived from the depth of the trace activities executed during the execution of the build instruction that is logged is selected from the group consisting of: network usage, incoming communication messages, outing communication messages, system process data, called routines, command level interface inputs, and respective metrics thereof.

3. The computer-implemented method of claim 1, further comprising, while executing the build instruction:
   logging the trace information derived from the depth of the trace activities executed during the execution of the build instruction in a log file.

4. The computer-implemented method of claim 3, further comprising, while executing the build instruction:
   determining, based on an analysis of the trace information logged in the log file, whether a log file entry corresponds to an authorized transaction.

5. The computer-implemented method of claim 4, further comprising, while executing the build instruction:
   adding a corresponding result of the analysis of the log file entry to an audit trail.

6. The computer-implemented method of claim 4, further comprising:
   terminating, in response to determining that the log file entry corresponds to an unauthorized transaction, an execution of the build instruction.

7. The computer-implemented method of claim 6, wherein determining that the log file entry corresponds to an unauthorized transaction includes:
   comparing the log file entry to an unpermitted list of build instructions; and
   matching a build code included in the log file entry to a same build code included in the unpermitted list of build instructions.

8. The computer-implemented method of claim 1, wherein the indicator value determined based, at least in part, on one or more configurable critical instructions associated with the build file.

9. The computer-implemented method of claim 1, wherein the monitoring level associated with the build instruction is determined based, at least in part, on a hardcoded mapping table.

10. The computer-implemented method of claim 1, further comprising:
    signing, in response to a completion of the software build, a manifest file.

11. A computer program product for monitoring and auditing secure software builds, the computer program product comprising one or more computer readable storage media and program instructions stored on the one or more computer readable storage media, the program instructions including instructions to:
    execute a sequence of build instructions included in a build file; and
    while executing each build instruction included in the build file:
       set an indicator value corresponding to a monitoring level associated with a build instruction, wherein the monitoring level is a depth of trace activities executed during the execution of the build instruction; and
       modify a level of logging of trace information derived from the depth of the trace activities executed during the execution of the build instruction based, at least in part, on the indicator value corresponding to the monitoring level.

12. A computer system for monitoring and auditing secure software builds, the computer system comprising:
    one or more computer processors;
    one or more computer readable storage media;
    computer program instructions, the computer program instructions being stored on the one or more computer readable storage media for execution by the one or more computer processors; and
    the computer program instructions including instructions to:
       execute a sequence of build instructions included in a build file; and
       while executing each build instruction included in the build file:
          set an indicator value corresponding to a monitoring level associated with a build instruction, wherein the monitoring level is a depth of trace activities executed during the execution of the build instruction; and
          modify a level of logging of trace information derived from the depth of the trace activities executed during the execution of the build instruction based, at least in part, on the indicator value corresponding to the monitoring level.

13. The computer system of claim 12, wherein one or more particular types of the trace information derived from the depth of the trace activities executed during the execution of the build instruction that is logged is selected from the group consisting of: network usage, incoming communication messages, outing communication messages, system process data, called routines, command level interface inputs, and respective metrics thereof.

14. The computer system of claim 12, further comprising, while executing the build instruction, program instructions to:
    log the trace information derived from the depth of the trace activities executed during the execution of the build instruction in a log file.

15. The computer system of claim 14, further comprising, while executing the build instruction, program instructions to:
    determine, based on an analysis of the trace information logged in the log file, whether a log file entry corresponds to an authorized transaction.

16. The computer system of claim 15, further comprising, while executing the build instruction, program instructions to:
    add a corresponding result of the analysis of the log file entry to an audit trail.

17. The computer system of claim 15, further comprising program instructions to:
    terminate, in response to determining that the log file entry corresponds to an unauthorized transaction, an execution of the build instruction.

18. The computer system of claim 17, wherein the program instructions to determine that the log file entry corresponds to an unauthorized transaction further includes instructions to:
    compare the log file entry to an unpermitted list of build instructions; and
    match a build code included in the log file entry to a same build code included in the unpermitted list of build instructions.

19. The computer system of claim 12, wherein the indicator value determined based, at least in part, on one or more configurable critical instructions associated with the build file.

20. The computer system of claim 12, wherein the monitoring level associated with the build instruction is determined based, at least in part, on a hardcoded mapping table.

* * * * *